June 19, 1934.  F. J. BRAINARD  1,963,433
FRUIT BASKET
Original Filed Sept. 12, 1933  2 Sheets-Sheet 1

Inventor
F. J. BRAINARD
By Mason Fenwick Lawrence
Attorneys

June 19, 1934.　　　　F. J. BRAINARD　　　　1,963,433
FRUIT BASKET
Original Filed Sept. 12, 1933　　2 Sheets-Sheet 2
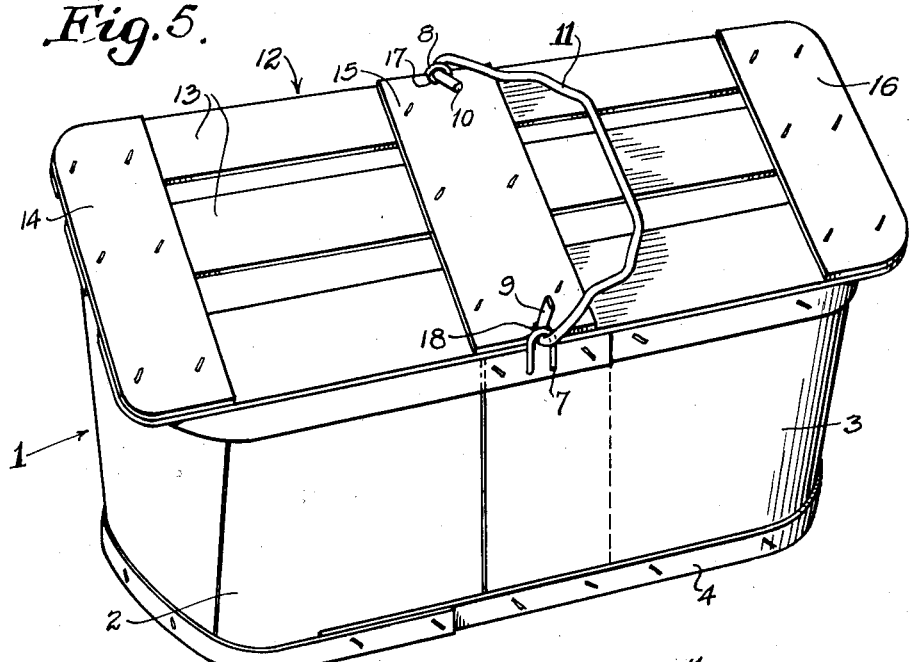
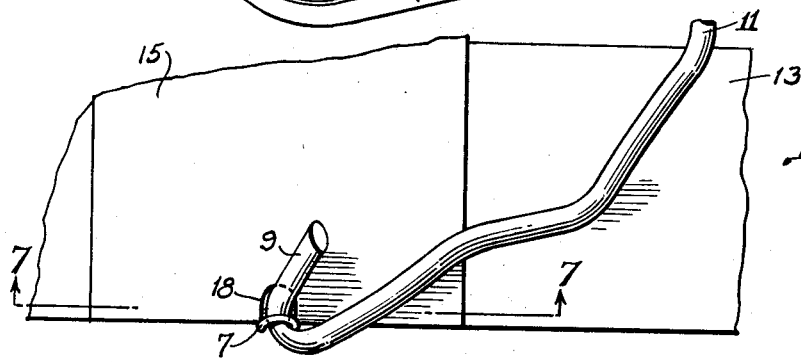
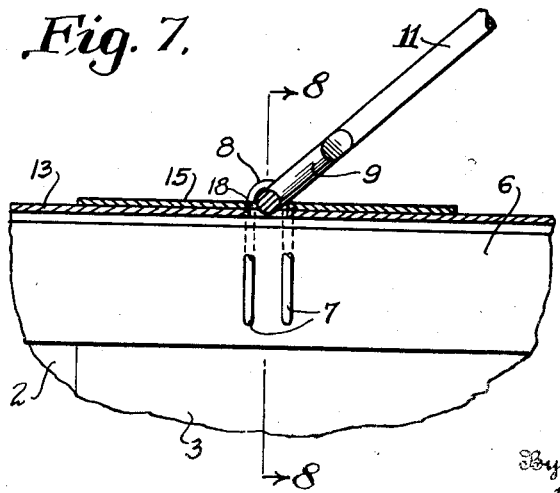
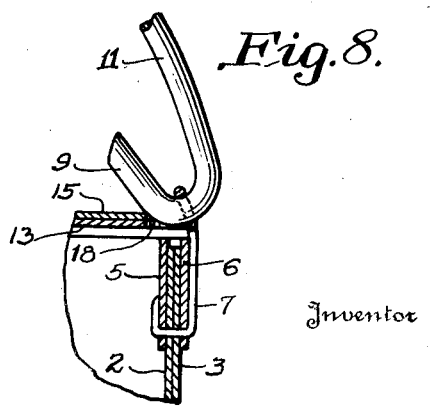
F. J. BRAINARD
By Mason Fenwick Lawrence
Attorney Patented June 19, 1934

1,963,433

UNITED STATES PATENT OFFICE 1,963,433

FRUIT BASKET

Forest J. Brainard, Elizabeth City, N. C.

Application September 12, 1933, Serial No. 689,140
Renewed March 3, 1934

3 Claims. (Cl. 217—125)

The invention relates to a fruit basket of the type which comprises a container formed of wood veneer, or the like, and having a handle preferably formed by a bail made of heavy spring wire adapted to be detachably connected to staples in the opposite sides of the body.

In its preferred form, the basket is provided with a raised cover particularly adapting it to the packaging of large fruit which project above the edge of the basket, and the cover is preferably secured in proper position on top of the basket by means of the detachable bail.

The principal object of the invention is to provide a fruit basket with raised cover of the character referred to, with novel means for holding the cover in place against both longitudinal and upward displacement.

Other objects of the invention will become apparent as the detailed description thereof proceeds.

In the drawings:

Figure 5 is a perspective view of a modified form of the invention;

Figure 6 is a fragmentary plan view of that form of invention shown in Figure 5;

Figure 7 is a vertical section taken along the line 7—7 of Figure 6; and

Figure 8 is a fragmentary section showing the relation of the bail to the basket cover.

Figure 1:
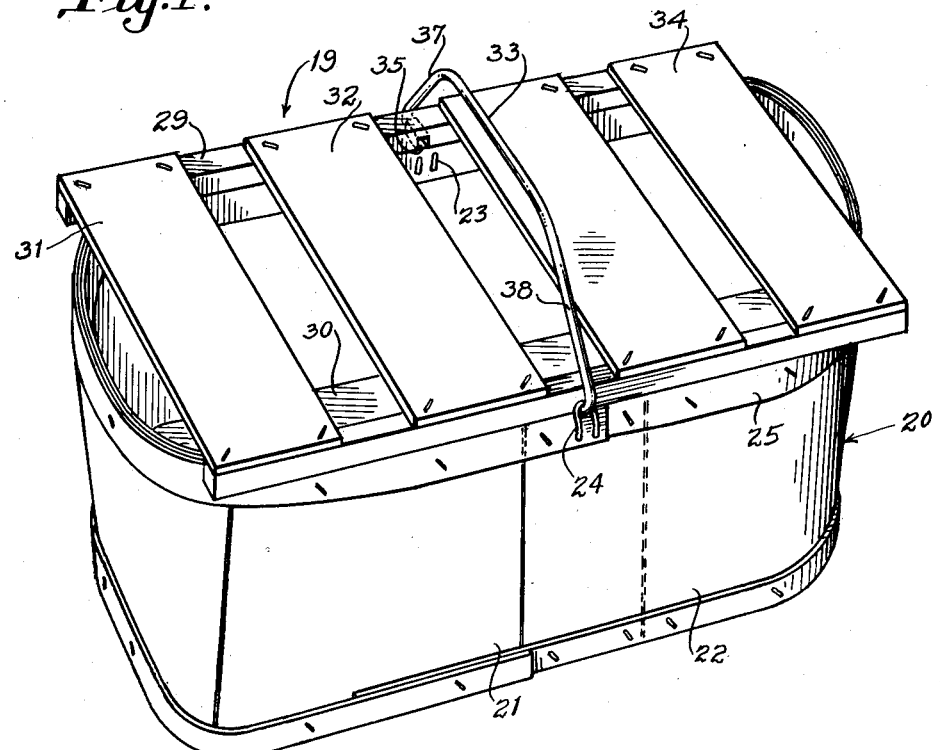
Figure 1 is a perspective view of one form of my improved fruit basket.

Referring now in detail to the figures, the numeral 20 represents the body of the basket or container which is preferably formed from wood veneer 22 and bound adjacent the bottom and top by wood veneer strips 21 and 25. Staples 23 and 24 are secured to the container or body portion of the basket at opposite sides, said staples passing through the upper wood veneer binding 25 as well as through the sides 22 of the basket.

The cover is constituted by a pair of longitudinal runners 29 and 30 which are preferably made of wood of sufficient thickness to give the cover the desired elevation. It will be understood that this basket is designed for packaging of large fruits such as tomatoes or apples which in a standard basket project above the top edges thereof so that the cover must be elevated to accommodate them. The cover is completed by slats 31, 32, 33 and 34; these slats are shown preferably separated to give ventilation to the food and provide visibility, but it is of course within the purview of the invention to put the slats together or substitute them by a single piece.

It is most important that when the basket is packed and the cover in place, the latter shall be maintained as rigidly as possible against lateral movement relative to the body or container since sliding of the edges of the runners 29 and 30 against the fruit will of course cut the fruit skins and incite decay, besides spoiling the appearance of the fruit. This is accomplished in the present invention by making the staples 24 as short as possible so that there will be no bending or lateral displacement of the tops of the staples through stresses incident to the vibrations and shocks encountered during shipment. If the staples were made so long as to reach above the tops of the runners 29 and 30, they would oppose very little resistance to lateral swaying in either direction. The staples 24 may therefore be considered as rigid fastening means, and the runners 29 and 30 are formed with notches 35 and 36 in their lower portions adapted to come into alinement with the bights of the staples when the cover is in place. The baskets are provided with detachable bails 33 of resilient wire, the ends 26 and 27 of which are bent inwardly and which pass through the staples and through the notches 35 and 36 as clearly shown in Figure 7, thus inhibiting any longitudinal shifting of the cover. The bail also serves the function of pressing the cover resiliently into engagement with the underlying fruit, thus holding the latter firm and preventing upward displacement of the cover. With this end in view, the bail is provided with inclined limbs 37 and 38 which engage the cover on opposite sides, above the notches 35 and 36.

In packing the basket, the bail is separate at the time the fruit is packed and the cover put in place. One end of the bail is then hooked through one of the staples and inserted in one of the notches, and the bail is then stretched so that the opposite inturned end can be introduced through the opposite staple and through the notch adjacent thereto. The angularity of the inclined limbs 37 and 38 is such that when the bail is placed in position it presses downwardly against the cover.

The form of the invention illustrated in Figures 5 to 8, inclusive, comprises a body 1 formed of wood veneering and constructed substantially as described in my pending application referred to; that is, with the side veneer sections or splints overlapped to form the vertical parts of the three piece handle described in said application. As shown in Figures 5 and 8, one of the parts of this three piece handle is formed by the overlapping ends of the wood veneer splints 2 and 3 which are stapled at their lower ends through the bottom rim 4 to the bottom of the basket, and at their upper ends are stapled to inner and outer strips 5 and 6. The strips 5 and 6 form with the upper ends of the overlapped splints 2 and 3 a reinforced top rim adapted to receive the staples 7 and 8. The bight or loop of each of these staples extends above the upper edge of the top rim a sufficient distance to receive the hooks 9 and 10 formed at the opposite lower ends of the bail or handle 11.

In this form of the invention, the cover, designated generally by the reference character 12, is formed of strips 13 running lengthwise of the basket and secured in proper spaced relation to each other by means of the transverse ledges 14, 15 and 16 which are stapled, or otherwise secured to the strips 13. The center ledge 15 and the parts of the strips 13 immediately below the ends of this ledge 15 are provided with notches 17 and 18 adapted to form seats to receive the upwardly inclined inturned ends of the hooks 9 and 10. The notches are so shaped and dimensioned that their edges contact and cooperate with the short ends of the hooks 9 and 10 to hold the handle 11 normally and yieldingly in a position substantially vertical when the fruit baskets are packed.

In the operation of this form of the invention, it is understood that, as usual, the baskets are shipped in nested form to the fruit growers with the wire bails and covers stacked flat and separated from the baskets. When the baskets are filled with fruit, the bails and covers are applied. The bails are made of comparatively heavy spring wire which draw the stiff reinforced sides of the basket toward each other and uniformly compress the fruit from side to side making a tight pack without injury to the fruit. When the cover is applied to the basket and the bails are hooked over the staples 7 and 8, the upward pressure of the fruit acting through the notches 17 and 18 on the short ends of the hooks 9 and 10 tends to hold the handles or bails 11 in substantially vertical position.

Figure 2:
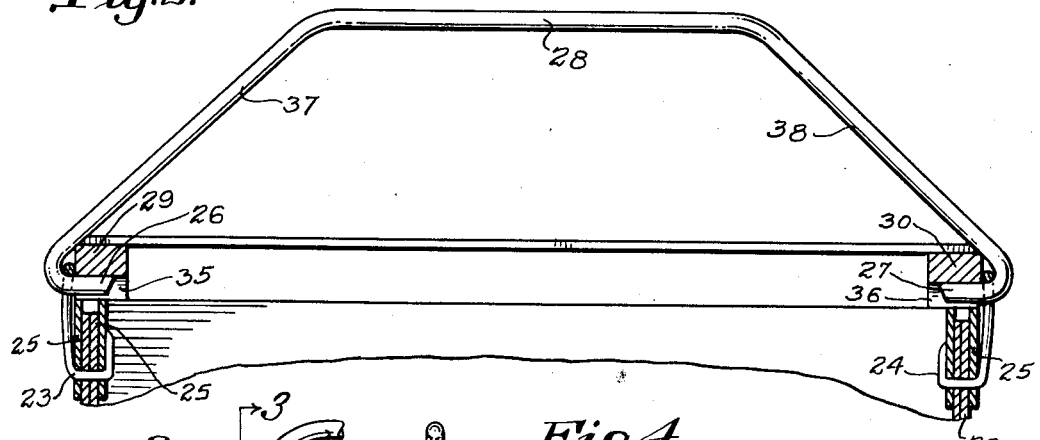
Figure 2 is a fragmentary vertical section taken transversely across the middle of the basket shown in Figure 1.
Figure 3:
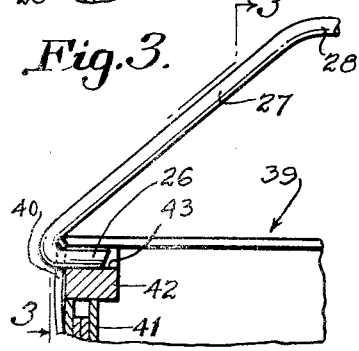
Figure 3 is a detail partly in section showing a slightly modified form of the invention.
Figure 4:
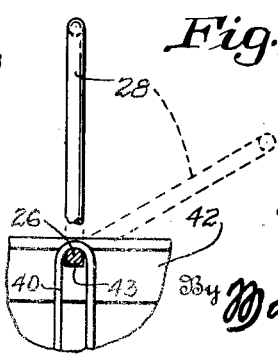
Figure 4 is a section taken along the line 3—3 of Figure 3.

In the modification shown in Figure 1, the cover 19 is of a raised type, and is particularly adapted for use in the packing of larger fruit such as peaches or tomatoes; while the basket shown in Figures 5 to 8 is designed for packing fruit of the smaller grape type. The body 20 of the basket shown in Figures 1 and 2 is substantially the same as that shown in Figure 5 of the drawings; that is, the sides are formed with splints of wood having the grain running upwardly, and with the adjacent ends of the sections 21 and 22 overlapped and stapled to the bottom of the basket and to the strips which form the rims thereof.

In this modified form of the invention, the staples 23 and 24 are passed through the upper rim 25 at the centers of the opposite sides. These staples extend above the top edge of the upper rim just enough to permit the aligned inturned ends 26 and 27 of the bail 28 to enter the staples and rest on said upper edge. The cover 19 in this case comprises two runners 29 and 30 adapted to seat on the top of the rim 25 at opposite sides of the basket. The runners 29 and 30 are secured to each other in properly spaced apart relation by the transverse ledges 31, 32, 33 and 34.

At their centers, the runners 29 and 30 are provided with the notches 35 and 36, respectively, to receive the aligned inturned ends 26 and 27 of the bail 28. These notches and inturned ends cooperate to position the cover 19 on the basket 20 and prevent sliding movement lengthwise of the basket. It will be noted from Figures 5 and 6 of the drawings that the bail is formed so that the sides 37 and 38 are inclined to the inturned ends 26 and 27. These inclined sides 37 and 38 contact with the upper edges of the runners 29 and 30 and cooperate with said runners to hold the cover 19 yieldingly in closing position on the basket 20.

It will be apparent that various changes may be made in the form, construction and arrangement of the parts without departing from the spirit and scope of my invention, or sacrificing any of the material advantages thereof; and I reserve the right to make all such changes as fairly fall within the scope of the annexed claims.

What I claim is:

1. A fruit basket, pivot lugs extending above the top edges of the opposite sides of said basket, a cover seated on said edges between said lugs and with at least part of its opposite edges below the tops of said lugs, a resilient yoke shaped bail having its opposite ends bent inwardly and upwardly toward each other and passing through said lugs, the said edges of said cover being provided with recesses receiving said ends to lock the cover against upward and lengthwise movement on said basket.

2. Fruit basket comprising a container and a cover therefor, said cover including longitudinal runners adapted to rest on the top side edges of the container, said runners being of such thickness as to give the desired elevation to the cover, and slats secured to the tops of said runners, staples secured to the opposite sides of the body projecting slightly above the upper edge thereof, said runners being notched substantially in alinement with the bight of said staples, and a resilient wire bail having its opposite ends bent inwardly toward each other and passing through said staples and notches, said bail having oppositely inclined limbs resiliently engaging said cover above said notches when said bail is in position.

3. A fruit basket, pivot lugs extending above the top edges of the opposite sides of said basket, a cover seated on said edges between said lugs and with at least part of its opposite edges below the tops of said lugs, a resilient yoke-shaped bail having its opposite ends bent inwardly towards each other and passing through said lugs, the said edges of said cover being provided with recesses receiving said ends to lock the cover against upward and lengthwise movement on said basket.

FOREST J. BRAINARD.